United States Patent
Brass

[15] 3,662,762
[45] May 16, 1972

[54] CORN SHELLER

[72] Inventor: Ronald W. Brass, Ackley, Iowa

[73] Assignee: Iowa State University Research Foundation, Ames, Iowa

[22] Filed: Aug. 31, 1970

[21] Appl. No.: 68,375

[52] U.S. Cl. .................................................................130/6
[51] Int. Cl. ..........................................................A01f 11/06
[58] Field of Search ....................130/6, 8, 27 H, 27 HA, 30 E

[56] References Cited

UNITED STATES PATENTS

| | | | |
|---|---|---|---|
| 1,821,316 | 9/1931 | Oakes | 130/6 |
| 2,403,638 | 7/1946 | Clark | 130/27 HA |
| 2,265,380 | 12/1941 | Maginn | 130/27 H |
| 2,771,078 | 11/1956 | Summers | 130/30 E |
| 2,325,654 | 8/1943 | Borchers | 130/6 |
| 3,508,556 | 4/1970 | Kaminski | 130/8 |

Primary Examiner—Antonio F. Guida
Attorney—Zarley, McKee & Thomte

[57] ABSTRACT

A corn sheller comprising a frame means having a first pneumatic roller means rotatably mounted thereon about a horizontal axis and having a second pneumatic roller means rotatably mounted thereon about a horizontal axis which is spaced from the first roller means to define a feed opening therebetween. A feed hopper is positioned above the feed opening for feeding corn ears thereto. An arcuate concave means is positioned below the feed opening and extends downwardly therefrom in a spaced relationship with respect to the periphery of the first roller means. A power means is connected to the first and second roller means for rotating the same in the same direction whereby the first and second roller means will cause a corn ear to pass downwardly through the feed opening so that the longitudinal axis of the corn ear will be parallel to the rotational axis of the first roller means. The space between the concave means and the periphery of the first roller means is such that radial compressive forces are applied to the corn ear to loosen the kernels thereon without damage thereto. The concave means is comprised of a plurality of parallel rods which are adapted to cooperate with the first roller means to apply the radial compressive forces to the corn ear.

4 Claims, 6 Drawing Figures

Patented May 16, 1972  3,662,762
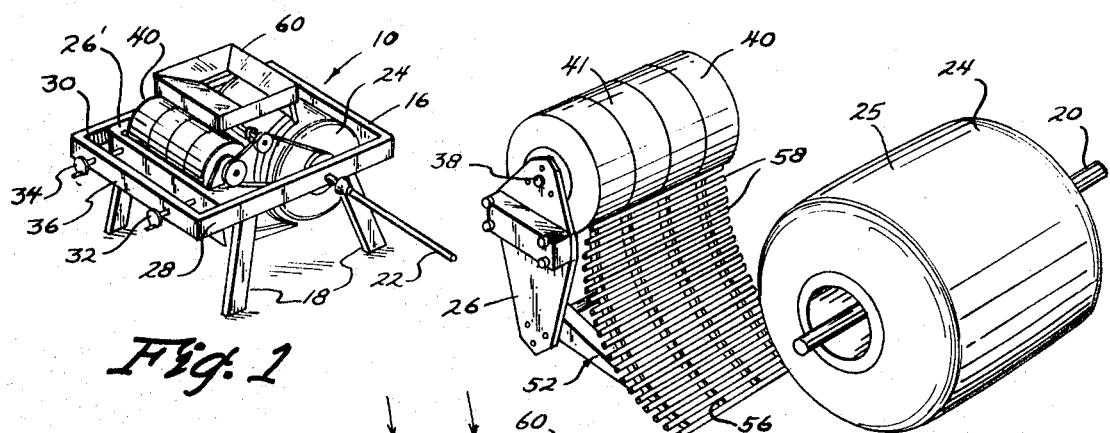
Fig. 1
Fig. 2
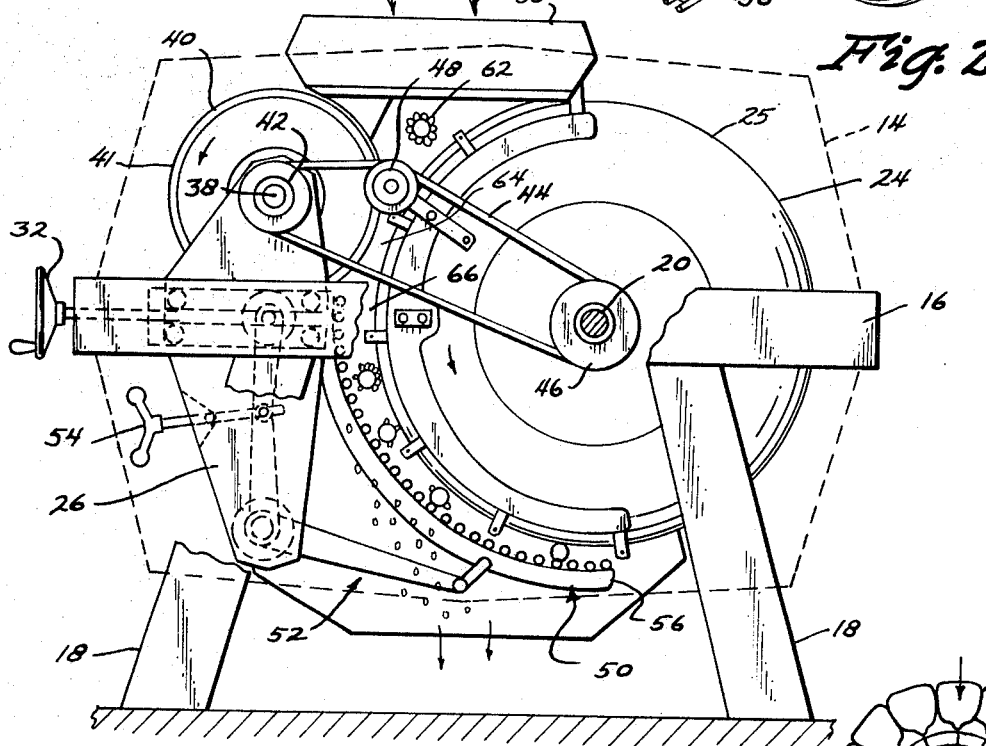
Fig. 3
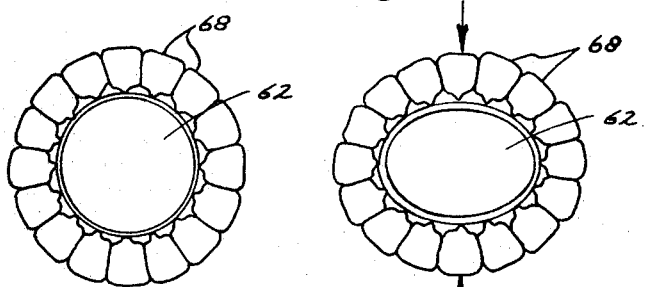
Fig. 4   Fig. 5
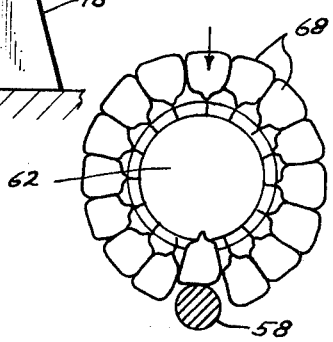
Fig. 6
INVENTOR
RONALD W. BRASS
BY
Zarley, McKee & Thomte
ATTORNEYS

CORN SHELLER

Conventional corn shellers generally employ cooperating metal cylinder and concave assemblies to shell the kernels from the ears. The conventional shellers damage the kernels due to the external scratching or scraping applied thereto by the cylinder and concave assembly. Further, the conventional shellers do not have satisfactory means for properly positioning or orientating the corn ears as they pass therethrough so as to insure efficient shelling.

Therefore, it is a principal object of this invention to provide an improved corn sheller.

A further object of this invention is to provide a corn sheller having an integral ear orientation system.

A further object of this invention is to provide a corn sheller employing a pneumatic roller which cooperates with a concave assembly.

A further object of this invention is to provide a corn sheller having an improved means for removing the kernels from the ears.

A further object of this invention is to provide a corn sheller which reduces damage to the kernels.

A further object of this invention is to provide a corn sheller which removes the kernels from the ears by creating an interaction among the kernels.

A further object of this invention is to provide a corn sheller which includes a pair of pressure adjustable pneumatic rollers.

A further object of this invention is to provide a corn sheller which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top perspective view of the sheller of this invention.

FIG. 2 is an exploded perspective view of a portion of the sheller.

FIG. 3 is a side elevational view of the sheller with portions thereof cut away to more fully illustrate the invention.

FIG. 4 is a sectional view of a corn ear.

FIG. 5 is a sectional view of a corn ear illustrating the interaction amongst the kernels upon radial compressive force being applied thereto.

FIG. 6 is a view similar to FIG. 5 except that radial compressive force has been applied to one row of the kernels.

The corn sheller of this invention is generally designated by the reference numeral 10 and comprises generally a frame means 12 having a removable housing 14 positioned thereon. Frame means 12 includes a horizontal frame 16 supported by a plurality of legs 18. Shaft 20 is rotatably mounted on the frame 16 about a horizontal axis and is adapted to be connected to a power-take-off shaft 22 extending from a tractor or the like. A pneumatic primary roller 24 having a substantially smooth outer peripheral surface 25 is mounted on shaft 20 within the frame 16 for rotation therewith and is inflatable to carry the pressure therein.

A concave carrier assembly 26 is horizontally slidably mounted on the frame member 28 of frame 16. A concave carrier assembly 26' is also slidably mounted on the frame member 30 of frame 16 and is identical to the concave carrier assembly 26. Concave carrier adjusting cranks 32 and 34 extend through frame member 36 of frame 16 and are connected to the concave carrier assemblies 26 and 26' to provide an adjustment means for the concave carrier assembly.

Shaft 38 is rotatably mounted in and extends between the upper ends of the concave carrier assemblies 26 and 26' and has a pneumatic orientation roller 40 has a substantially smooth outer peripheral surface 41 and is mounted thereon. Roller 40 is inflatable to provide a means for varying the pressure therein. Pulley 42 is mounted on the shaft 38 and receives a belt 44 extending therearound. Belt 44 also extends around a pulley 46 secured to shaft 20 so that rotation of shaft 20 causes the rotation of shaft 38. The numeral 48 refers to a spring tension belt idler to maintain the necessary tension in the belt 44.

The numeral 50 refers to an adjustable concave which is operatively pivotally connected at its upper end to the concave carrier assemblies 26 and 26' and which extends downwardly therefrom in the manner illustrated in FIG. 3. A concave adjusting arm assembly 52 is connected to the concave 50 and is selectively controlled by the concave adjusting handle assembly 54 to provide a means for moving the concave 50 with respect to the periphery of the roller 24 to vary the space therebetween. Concave 50 is comprised of a frame means 56 having a plurality of spaced apart parallel rods 58 supported thereon. A feeder hopper 60 is operatively secured to the frame means 16 and is adapted to contain a plurality of corn ears 62 therein to feed the same downwardly into the feed opening space 64 between the rollers 24 and 40.

In operation, the corn ears 62 are placed in the feeder hopper 60 and the power-take-off shaft 22 is rotated by the tractor or the like to cause the rotation of shaft 20 and shaft 38. As viewed in FIG. 3, both the rollers 24 and 40 are rotated in a counterclockwise direction and it can be seen that the primary roller 24 will have a higher peripheral velocity than roller 40. When proper position and clearance adjustments have been made between the rollers 24 and 40, the corn ears will only pass to the concave area 66 if they have achieved an orientation parallel to the axes of the two rollers. Such an orientation is achieved by the fact that the peripheral travel of roller 40 is opposite to the peripheral travel of the roller 24, such a relationship tending to straighten or orient the ear. The fact that the corn ears are supplied to the concave area 66 only when they have achieved an orientation parallel to the axes of the two rollers results in consistent radial compressive loading of the corn ears resulting in minimum damage during shelling. The compressive loading of the corn ears can be controlled by varying the inflation pressure within the roller 24 and by adjusting the concave with respect to the roller 24. FIG. 5 illustrates the manner in which the corn ears may be compressed upon the resilient roller 24 compressing the ear between the roller and the concave 50. Radial compressive force applied to the corn ear causes the ear to assume the shape seen in FIG. 5 and it can be seen that the kernels 68 in one row of kernels are deflected against kernels in adjacent rows to achieve an interaction between the kernels which aids in loosening the kernels from the ear. The interaction of the kernels increases the shelling action and reduces damage to the kernels since external scratching and scraping thereof is eliminated. FIG. 6 illustrates the manner in which a row of kernels 68 may be moved inwardly with respect to the ear upon engaging one of the parallel bars 58. Inward movement of the kernels by the bar 58 causes the adjacent kernels to be loosened from the ear due to the fact that the kernel is wider at its outer end and the movement of the kernels toward the center of the ear tends to loosen the adjacent kernels as seen in FIG. 6.

Thus it can be seen that a unique system has been provided for orientating all of the corn ears prior to application of the load required for shelling. Such orientation is accomplished by the two pneumatic rollers thereby resulting in consistent radial compressive loading of the corn ears to minimize kernel damage during shelling. It should be understood that resilient rollers could be substituted for the pneumatic rollers but the pneumatic rollers are the preferred embodiment. It can also be seen that a unique method has been provided for loading corn ears so that the magnitude of the applied load is controlled rather than attempting to control the size of opening through which the material must pass. This is achieved by the fact that the pneumatic roller 24 has the capacity for deformation under load. A unique and easily adjustable means of limiting the applied radial compressive load on the corn ears has also been provided since the applied load may be easily changed by altering the inflation pressure of the rollers. The concave design is such that the members 58 are parallel to an elastically yielding cylindrical roller 24, which in conjunction with the rolling action of a corn ear between them, provide rapidly repeating and intermittent radial loading. Such a type of loading significantly reduces kernel damage and improves shelling efficiency. The machine of this invention induces corn shelling with a significantly lower level of damage and at an increased shelling efficiency, especially when used with corn of relatively high or low moisture contents. It can therefore be seen that the invention accomplishes at least all of its stated objectives.

I claim:

1. A corn sheller comprising:

a frame means;

a first resilient roller means having a substantially smooth outer peripheral surface which will yieldably deflect in response to pressure being applied thereto and being rotatably mounted on said frame means for rotation about a horizontal axis;

a second resilient roller means having a substantially smooth outer peripheral surface which will yieldably deflect in response to pressure being applied thereto and being rotatably mounted on said frame means for rotation about a horizontal axis and being spaced from said first roller means to define a feed opening therebetween;

an arcuate concave means on said frame means extending downwardly from said feed opening in a spaced relationship with respect to the periphery of said first roller means;

said concave having a plurality of rods extending parallel to the rotational axis of said first roller means and being spaced from the peripheral surface of said first roller means so as to define a passageway for ears of corn therebetween; and power means connected to said first and second roller means for rotating said first and second roller means in the same direction so that the adjacent peripheral surfaces of said roller means are travelling in opposite directions, whereby said rollers will cause an ear of corn to be oriented with its longitudinal axis parallel to the rotational axes of said rollers and to pass downwardly through said feed opening.

2. A corn sheller comprising:

a frame;

a pneumatic roller rotatably mounted on said frame; said roller having a substantially smooth peripheral surface which will yieldably deflect in response to pressure being applied thereto;

an arcuate concave on said frame means, said concave having a plurality of rods extending parallel to the rotational axis of said roller and being spaced from the peripheral surface of said roller so as to define a possageway for ears of corn therebetween, said passageway having an upper and a lower end;

power means for rotating said roller whereby rotation of said roller will cause an ear of corn to pass through said passageway;

the space between said rods and said roller decreasing adjacent said lower end of said passageway whereby said ear of corn will be subjected to radial compressive forces between said rods and said roller adjacent said lower end of said passageway.

3. A corn sheller according to claim 2 comprising means adjacent said upper end of said passageway for orienting ears of corn in parallel relation to said rotational axis of said roller.

4. The corn sheller of claim 3 wherein said means adjacent said upper end of said passageway is a second roller rotatably mounted on said frame for rotation about an axis parallel to the rotational axis of said first mentioned roller; said first and second rollers being spaced apart a predetermined distance to define a feed opening therebetween; whereby an ear of corn passing through said feed opening when said first roller is rotating will engage both of said rollers and be oriented so that the longitudinal axis of said ear will be parallel to the rotational axes of both of said rollers.

* * * * *